(12) United States Patent
Iimura

(10) Patent No.: US 6,361,180 B1
(45) Date of Patent: *Mar. 26, 2002

(54) LIGHT DIFFUSING APPARATUS USING LIGHT GUIDE

(76) Inventor: Keiji Iimura, 10-8, Akatsuka 3-Chome, Itabashi-ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,225

(22) Filed: Mar. 13, 2000

Related U.S. Application Data

(60) Continuation-in-part of application No. 09/268,861, filed on Mar. 15, 1999, now Pat. No. 6,036,329, and a continuation of application No. 09/310,628, filed on May 12, 1999, now Pat. No. 6,039,452, which is a division of application No. 08/805,699, filed on Feb. 25, 1997, now Pat. No. 5,913,594.

(51) Int. Cl.[7] .............................. G01D 11/28; F21V 8/00
(52) U.S. Cl. .......................... 362/31; 362/551; 362/554
(58) Field of Search .......................... 362/551, 31, 26, 362/554; 385/901, 147; 349/67

(56) References Cited

U.S. PATENT DOCUMENTS

| | | | |
|---|---|---|---|
| 5,042,892 A | * | 8/1991 | Chiu et al. .................. 362/554 |
| 5,307,245 A | * | 4/1994 | Myers et al. ................ 362/554 |
| 5,400,225 A | * | 3/1995 | Currie ........................ 362/554 |
| 5,461,548 A | * | 10/1995 | Esslinger et al. ........... 362/554 |

* cited by examiner

*Primary Examiner*—Thomas M. Sember

(57) ABSTRACT

A light diffusing apparatus using light guide comprises at least first light guide portion for light leakage, second light guide portion solely for light transmission; and third light guide portion for an optical communication with first and second light guide portion. The first light guide portion has first end (or side surface) and second light guide portion has second end which is optically opposed to the first end. The third light guide portion forms substantially non-linear (or curved) cross-section and the first, second and third light guide portions form substantially a single-piece construction. At least a single transparent panel-like member (or, sheet-like, plate-like or film-like member) may be used for the first, second and third light guide portions. At least a ribbon-like optical fiber cable (i.e. tape-like or film-like optical fiber cable) may be used for the first, second and third light guide portions, having a plurality of optical fibers which are aligned in parallel each other. The light diffusing apparatus can output light with a desired predetermined distribution pattern of surface brightness i.e. luminance. The distribution pattern of output light may produce uniform i.e. even surface brightness i.e. luminance. Therefore, the light diffusing apparatus may be suitably used typically in surface light sources, photographic film viewers, backlights or front lights of a passive displays such as liquid crystal displays, light indicators and vehicle lights, etc.

66 Claims, 11 Drawing Sheets

LIGHT DIFFUSING APPARATUS USING LIGHT GUIDE

CROSS-REFERENCE TO THE INVENTION

This is a continuation-in-part application of U.S. patent application Ser. No. 09/268,861 filed on Mar. 15, 1999 now U.S. Pat. No. 6,036,329 and entitled "FLAT LIGHT SOURCE AND PASSIVE DISPLAY UTILIZING BYPASS LIGHT GUIDE", and U.S. patent application Ser. No. 09/310,628 filed on May 12, 1999, now U.S. Pat. No. 6,039,452 and entitled "FLAT LIGHT SOURCE WITH U-SHAPED CONFIGURATION" which are two divisional applications of U.S. patent application Ser. No. 08/805,699, filed on Feb. 25, 1997 and entitled "FLAT PANEL TYPE LIGHT SOURCE DEVICE AND PASSIVE DISPLAY DEVICE UTILIZING THE FLAT PANEL TYPE LIGHT SOURCE DEVICE", now U.S. Pat. No. 5,913,594 issued on Jun. 22, 1999.

BACKGROUND OF THE INVENTION (1) Field of the Invention

The invention relates generally to light diffusing apparatus or flat light devices, which are widely used for general lighting or illumination, and for backlight illuminating passive type display devices such as liquid crystal display devices. More particularly, the invention relates to light diffusing apparatus or flat light devices utilizing an edge lighting effect in which light rays are repeatedly reflected between front and rear surfaces of a light transmission panel.

Furthermore, the invention generally relates to passive type display devices with light diffusing apparatus or flat light source devices for use in backlight illuminating passive type display devices and more particularly to passive type display devices having surface light source or flat light source devices utilizing the edge lighting effect.

(2) Description of Related Art

Liquid crystal displays are a typical example of passive type displays, which do not emit light by their selves, and this differs from active type displays, which emit light by their selves such as CRTs and electro luminescent devices. Accordingly, liquid crystal displays of the transmissible type, as opposed to the reflective type, are utilized in combination with a flat light source or light transmission panel for backlighting which is located in the rear of such displays, so that the display can be clearly viewed by a user in dark environments as well as bright environments.

Conventionally, such light transmission panels are widely used for the flat light sources as backlights or film viewers to illuminate the passive type displays such as liquid crystal displays of transmissible type or transparency films with visual information such as photographic transparency films or OHP (overhead projector) transparency films, by combination with light sources such as linear fluorescent lamps, located at side surface of the light transmission panel (i.e. positioned laterally the light transmission panel.)

This type of lighting system is called an "edge lighting", or "light transmission panel" system, and the light transmission panel is made of transparent material with high light transmission characteristics such as acrylic resin and polycarbonate resin and glass. Light rays emitted from at least a light source are input to at least a side i.e. lateral surface of the light transmission panel. Such light rays are repeatedly reflected between front and rear surfaces in the light transmission panel. The light rays leak or are output gradually according to transmission of light rays to illuminate an object such as a liquid crystal display or a photographic transparency film.

The light transmission panel is ordinarily a panel or film having a rectangular surface area to be illuminated, which substantially corresponds to that of the liquid crystal display.

The light transmission panel for illumination has rectangular surfaces with two long sides and two short sides. There are following four types of the arrangement according to the positional relationships between the light transmission panel and the linear light source such as a linear fluorescent lamp:

(1) An arrangement in the short side-single light type in which a single linear light source is placed at a short side surface of the light transmission panel;

(2) An arrangement in the long side-single light type in which a single linear light source is placed at a long side surface of the light transmission panel;

(3) An arrangement in the short side-dual light type in which a linear light source is placed at each of the two short side surfaces of the light transmission panel; and (4) An arrangement in the long side-dual lights type in which a linear light source is placed at each of the two long side surfaces of the light transmission panel.

As is well known in the field, light rays incident on the light transmission panel for illumination are transmitted inside the light transmission panel, and the light rays repeat internal total reflections from the light incident side to opposite side in the light transmission panel. Some quantity of transmitted light reaches the opposite side in the light transmission panel. The rest of the transmitted light leaks progressively from the surface of the light transmission panel for illumination to the outside of the light transmission panel to illuminate a passive type display or a photographic transparency film.

Accordingly, in the case in which the short side-single light type or long side-single light type is used, the brightness of a surface projecting from the surface of the light transmission panel is falls off rapidly according to the distance from the light source. Such single light types cannot produce uniform surface brightness and have lower surface brightness according to the distance from the light source. In the case in which a light transmission panel with a large surface area must be illuminated, the single light types cannot be used because the distance over which light is to be transmitted is too great and the brightness of the surface is extremely low near the opposite side terminal which is far from the light input side in the light transmission panel.

Therefore, the single light types are limited to use in color liquid crystal displays of small surface area or to use in monochrome displays not requiring relatively high and uniform surface brightness. The dual light types are used in color and monochrome liquid crystal displays with large surface areas requiring relatively high and uniform surface brightness, such as monitors or displays for personal computers or television receivers. In particular, portable electronic devices, driven by battery power sources and having liquid crystal displays with backlights, must be light in weight and compact, such as in notebook or palm-sized personal computers and information and telecommunication terminals. The dual light types using fluorescent lamps are not suitable for this purpose because the weight is almost double and space in the housing for accommodating the lamps is almost double compared to the single light type.

Fluorescent lamps have variable brightness and the emission at different locations on the lamp surface because, for example, blacking increases from the electrodes toward the center of the lamp over time, as is known in fluorescent lamps for general lighting purposes. Furthermore, the area blackened is increases over time and the area blackened differs from lamp to lamp. Therefore, in dual light types using fluorescent lamps, uniformity in brightness and color displayed at different points on the surface of the light transmission panel decreases over time compared to the single light type.

SUMMARY OF THE INVENTION

An object of the present invention is to provide a novel light diffusing apparatus including light guide means.

Another object of the present invention is to provide a novel light diffusing apparatus including light guide means capable of outputting light with a desired distribution of luminance or brightness.

Still another object of the present invention is to provide a novel light diffusing apparatus including light guide means capable of outputting light with substantially uniform distribution of luminance or brightness.

The light diffusing apparatus of the present invention can be suitably used in various optical devices such as surface light devices, light indicators, backlights or front lights of passive displays e.g. liquid crystal displays (LCDs) and vehicle lights.

The present invention includes a first light guide portion for light leakage i.e. light diffusion, a second light guide portion solely for light transmission and a third light guide portion for an optical communication with the first light guide portion and said second light guide portion. The first, second and third light guide portions may form substantially a single piece construction.

The first light guide portion may be comprised of a first side surface (i.e. a first end or a first end face) and the second light guide portion is further comprised of a second side surface (i.e. a second end or a second end face).

The present invention may be further comprised of at least one light generating device, in which the first and/or second side surfaces receive (i.e. accept) light emitting from the light-generating device.

The second and third light guide portions have at least a major surface and the major surface may have a light reflective layer. The light reflective layer may be composed of a transparent layer with lower optical refractive index than the second portion. Alternatively, the light reflective layer may be composed of a reflective metal layer.

The first light guide portion may have at least a first major surface and/or a second major surface and a light diffusing (i.e. light scattering) means disposed on the first light guide portion, for diffusing light from the first major surface and/or the second major surface.

The light diffusing means may be composed of a plurality of grooves (or projections) disposed on the first major surface and/or the second major surface and the grooves may form a pattern such as multiple dots or multiple stripes. The grooves may be formed by means of such as filing with an emery paper, sand blasting, chemical etching, laser irradiation or hot stamping.

Alternatively, the light diffusing means may be composed of a plurality of light diffusing layers disposed on the first major surface and/or the second major surface. The light diffusing layers may form a pattern such as multiple dots and/or multiple stripes.

The light diffusing layers may be formed by coating using painting material including multiple light diffusing powders, pigments or beads on the first major surface and/or the second major surface.

The first and second light guide portions may form substantially linear (i.e. planer) cross section, while the third light guide portion may form substantially non-linear cross section. The first light guide portion, second light guide portion and third light guide portion may form a U-shaped cross section as a whole; and each of the first light guide portion and the second light guide portion is a leg of the U-shaped cross section and the third light guide portion is a bottom of the U-shaped cross section.

A first aspect of the light diffusing apparatus includes single piece light guide means which have a single transparent panel-like member (or, sheet-like, plate-like or film-like member) and the transparent panel-like member has a first light guide portion for light leakage or light diffusion, a second light guide portion solely for light transmission and a third light guide portion for an optical communication with the first light guide portion and the second light guide portion, and the first, second and third light guide portions form substantially a single piece construction and have substantially a U-shaped construction as a whole.

The light diffusing apparatus based on the first aspect of the present invention may be manufactured according to following steps and following orders: a preparing step wherein a single panel-like member is so prepared that the first light guide portion has a first function for light transmission and light leakage, while the second and third light guide portions have a second function for solely for light transmission, in which the third light guide portions is positioned in an interim zone between the first light guide portion and the second light guide portion; a heating step wherein a heat is applied to at least the third light guide portions in order to sufficiently soften by means of a heater; a bending step wherein the third light guide portion is so bent during softening that the first and second portions are substantially parallel each other and the third portion has curved cross section; and a cooling step wherein the heat is removed so that the light diffusing apparatus keeps said U-shaped cross section in an ambient temperature.

A second aspect of the present invention includes a first light guide portion for light leakage or light diffusion, a second light guide portion solely for light transmission, a third light guide portion for an optical communication with the first light guide portion and the second light guide portion, wherein the first, second and third light guide portions form substantially a single piece construction; and wherein the first, second and/or third light guide portions are composed of at least a ribbon-like optical fiber cable having a first end and a second end and the ribbon like-like optical fiber cable is composed of a plurality of optical fibers parallel each other.

The ribbon-like optical fiber cable may have a linear or planer portion corresponding to the first and second light guide portions of the optical fiber cable and may have a non-linear or bent portion corresponding to the third light guide portion formed by bending an interim along a longitudinal length of the optical fiber cable. The first and second portions form linear cross sections, while said third portion forms a non-linear cross section, which is a bent or curved portion located at an intermediate section or zone between an end of the first light guide portion and an end of the second light guide portion.

Each one of the optical fibers of the second and third portions may have a core and a cladding to cover the core so as not to allow light leakage, in which refractive index of the core is higher than refractive index of the cladding, while each one of the optical fibers of the first portions may have a core and has not at least partially or entirely the cladding so as to allow light leakage.

Because the first, second and third light guide portions are a single piece construction, that is, a single unit in all the aspects of the present invention, an optical communication i.e. an optical coupling with the first and second light guide portions are very effectively carried out with minimum leakage of light transmission, as compared with the case in which all the first, second and third light guide portions are separated i.e. isolated and the transmission loss is very large between the second and third light guide portions and between the first and third light guide portions.

DESCRIPTION OF THE PREFERRED EMBODIMENTS

Figure 1:
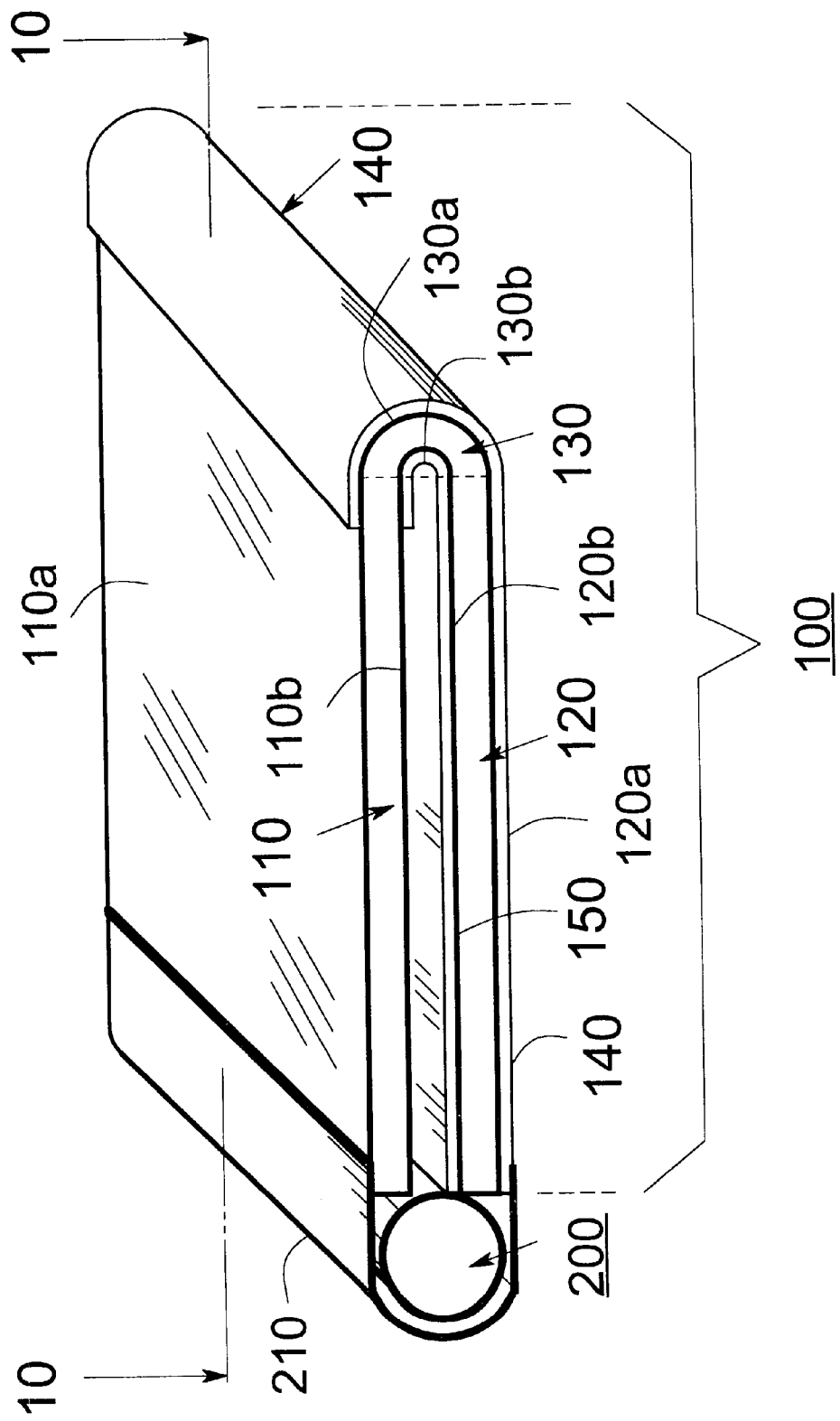
FIG. 1 is a schematic perspective view of a light diffusing apparatus according to first proffered embodiment of the present invention.
Figure 2:
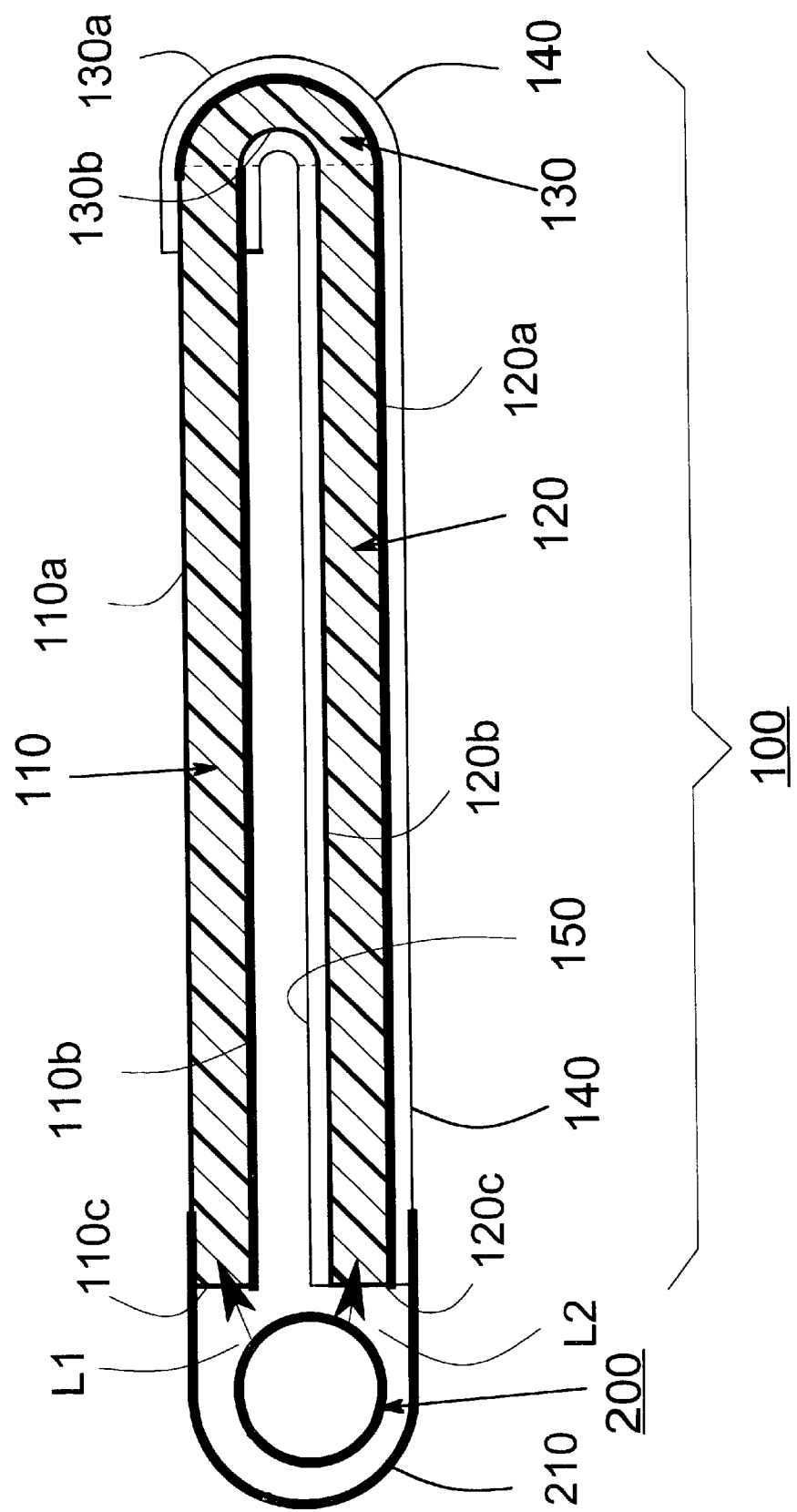
FIG. 2 is an enlarged cross-sectional view of the light diffusing apparatus taken along the line 10—10 in the perspective FIG. 1.
Figure 3:
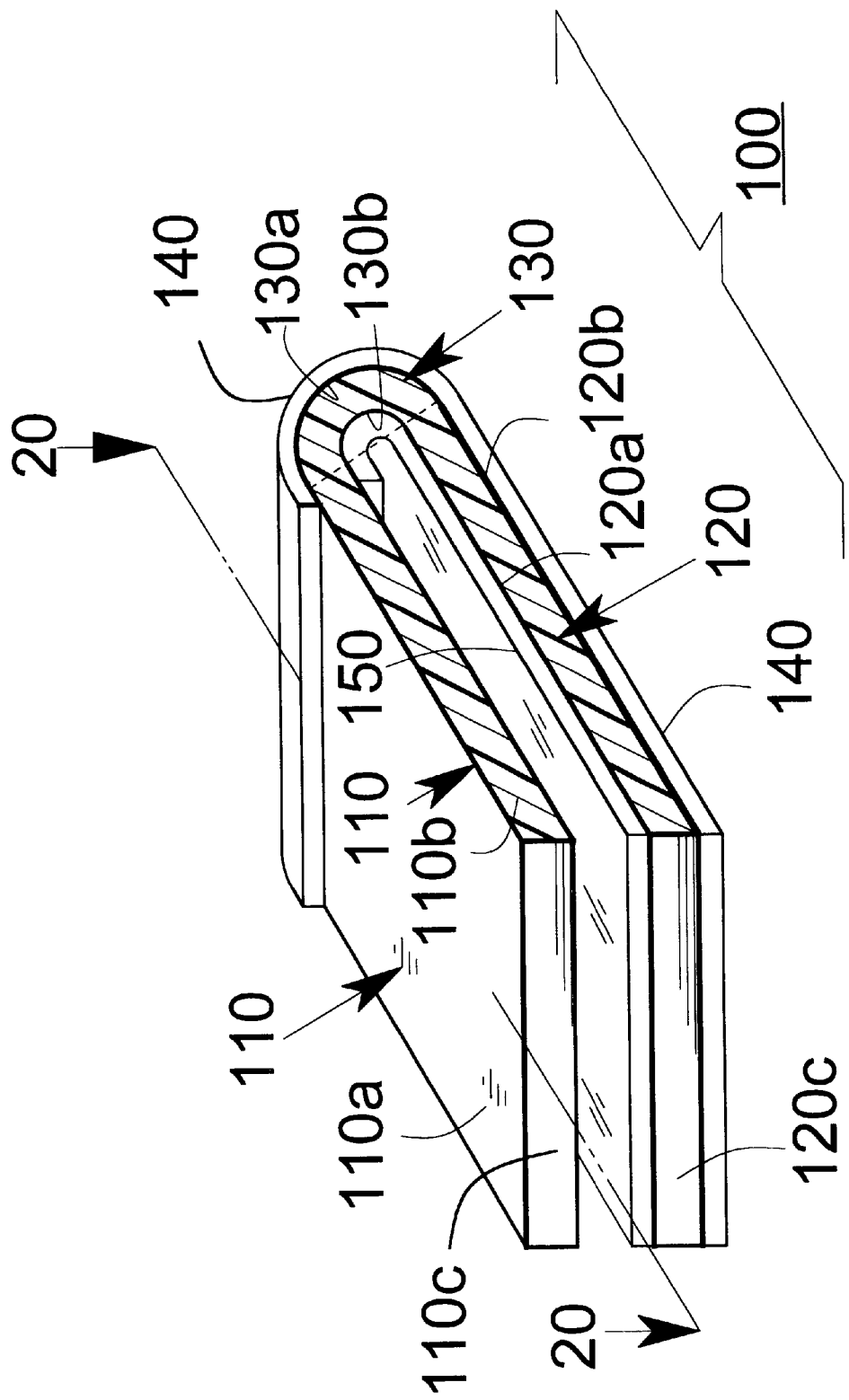
FIG. 3 is a schematic perspective view of a light diffusing apparatus 100 according to first proffered embodiment of the present invention.
Figure 4:
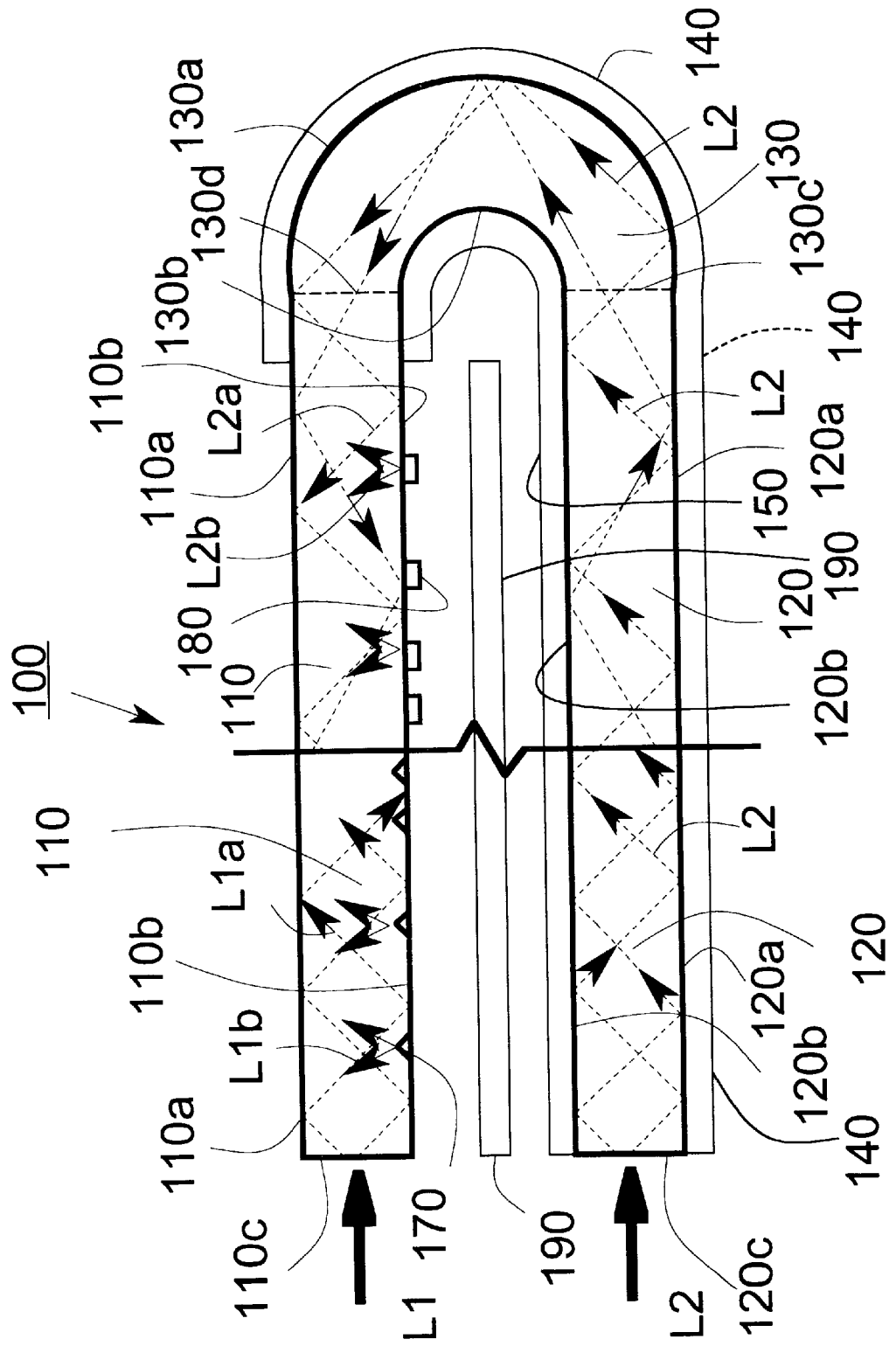
FIG. 4 is a partial enlarged cross-sectional view of the light diffusing apparatus 100 taken along the line 20—20 in the perspective FIG. 3, showing light transmission path.
Figure 5:
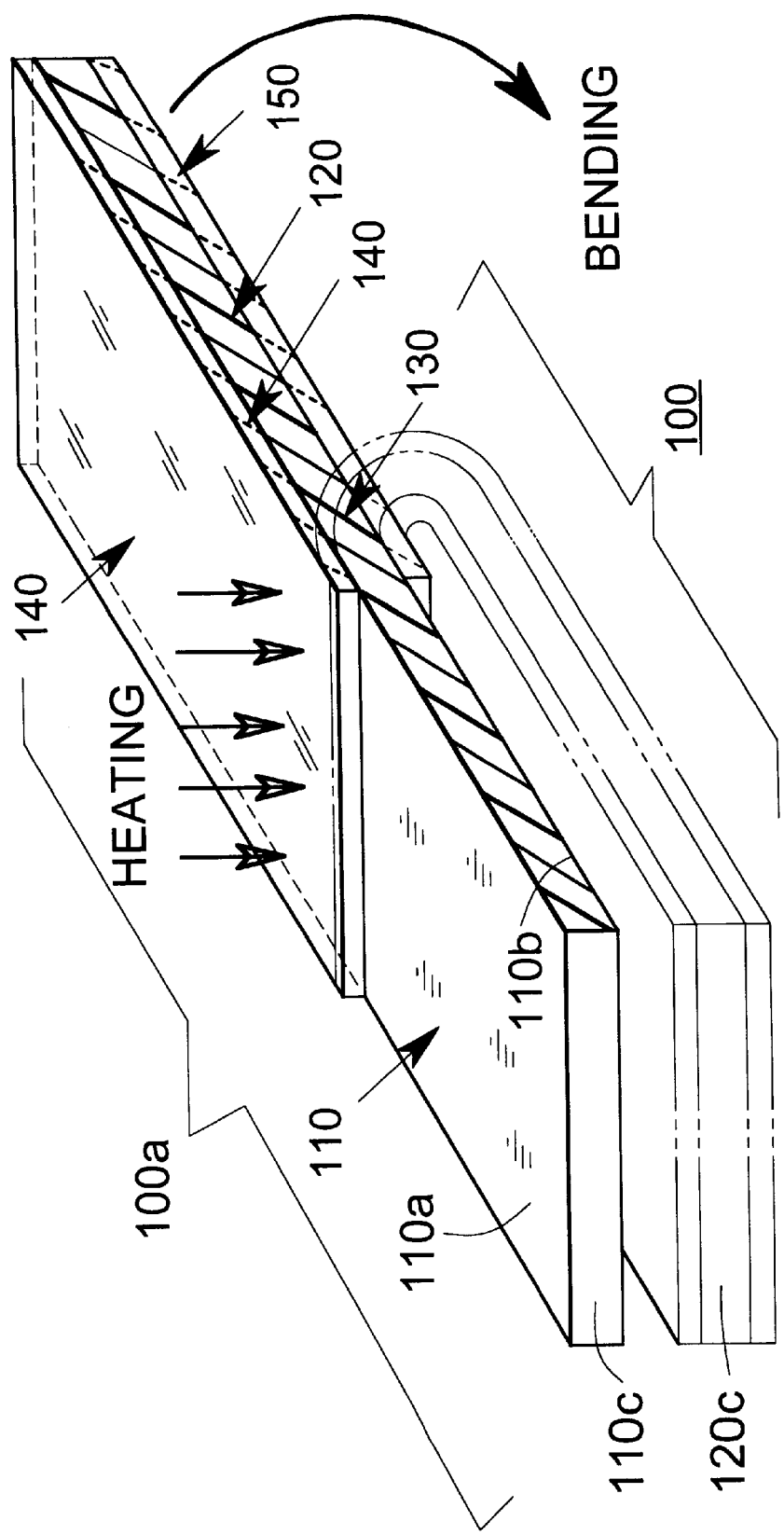
FIG. 5 is a schematic perspective view, showing a method for manufacturing the light diffusing apparatus 100 according to first proffered embodiment of the present invention.

Reference is made to FIG. 1, FIG. 2, FIG. 3, FIG. 4, and FIG. 5 showing first preferred embodiment of the present invention. FIG. 1 shows a schematic perspective view of a light diffusing apparatus according to first proffered embodiment of the present invention; FIG. 2 is an enlarged cross-sectional view of the light diffusing apparatus taken along the line 10—10 in the perspective FIG. 1; FIG. 3 is a schematic perspective view of a surface light 100 according to first proffered embodiment of the present invention; FIG. 4 is a partial enlarged cross-sectional view of the surface light 100 taken along the line 20—20 in the perspective FIG. 3 showing light transmission path; and FIG. 5 is a schematic perspective view showing a method for manufacturing the light diffusing apparatus 100 according to first preferred embodiment of the present invention.

In FIG. 1, FIG. 2, FIG. 3 and FIG. 4, the first preferred embodiment of the present invention is shown in which an inventive concept of the first aspect of the present invention is realized or embodied.

The light diffusing apparatus is composed of a single-piece light guide means 100 (e.g. a surface light device, an edge light device or a backlight device) having a single transparent panel-like member (or, sheet-like, plate-like or film-like member). The single transparent panel-like member is composed of first light guide portion 110 for light leakage and light transmission, second light guide portion 120 solely for light transmission and a third light guide portion 130 for an optical communication with the first light guide portion 110 and the second light guide portion 120. The first light guide portion 110, a second light guide portion 120 and a third light guide portion 130 form a single-piece construction (i.e. a one-piece unit or an integral unit) and have substantially a U-shaped construction as a whole.

A light-generating device 200 may be composed of at least one lamp such as a linear light or a spotlight. A linear fluorescent lamp 200 with cold or hot cathodes may be suitably used for the lamp in the preferred embodiment as shown in FIG. 1 and FIG. 2. A light reflecting means 210 such as at least a light reflector may be used for reflecting light emitting from the fluorescent lamp 200 as shown in FIG. 1 and FIG.

The first light guide portion 110 has a major surface 110a i.e. an outer surface, another major surface i.e. an inner surface 110b and a side surface 110c (i.e. an end, an end surface or an end face). The second light guide portion 120 has a major surface i.e. an outer surface 120a and another major surface i.e. an inner surface 120b and a side surface 110c. The third light guide portion 130 has a major surface i.e. an outer surface 130a and another major surface i.e. an inner surface 130b.

The second light guide portion 120 may preferably be provided with a light reflective layer 140 disposed on its outer surface 120a and/or another light reflective layer 150 disposed on its inner surface 120b. The light reflective layer 140 or 150 is composed of a transparent layer having lower optical refractive index than the second light guide portion 120, in which second light guide portion 120 is acting as a core and the light reflective layers 140 and 150 are acting as a cladding i.e. a sheath, in which a combination of the second light guide portion 120 and the light reflective layers 140 and 150 have the function of transmitting light effectively with minimized loss which is equivalent to optical fibers as widely known in the technical field of fiber optic telecommunication.

Alternatively, reflective metal layers i.e. metallic mirror-like films may be used as a substitute for the transparent layer 140 and 150. However, the light reflective layers 140 and 150 may be omitted for simplification of light diffusing apparatus 100.

The first light guide portion 110 may preferably be provided with light diffusing (i.e. light scattering) means disposed on first light guide portion 110, for diffusing light from first major surface 110a and/or second major surface 110b.

The light diffusing means, for an example, may be composed of multiple grooves (or projections) or the like disposed on the first major surface 110a and/or the second major surface 110b. In FIG. 4, a plurality of the grooves 170 is disposed on the inner surface 110b of first light guide portion 110.

The grooves 170 may be formed typically on the second major surface 110b (FIG. 4) and/or the first major surface 110a by means of such as filing with an emery paper, sand blasting, chemical etching, laser irradiation or hot stamping so as to have a desired and predetermined pattern on the surfaces 110a or 110b. For the predetermined pattern, multiple dots and/or multiple stripes may be preferably used.

Generally, such grooves 170 are divided into two kinds, that is, small flaws (i.e. scratches) and large flaws, in which the small flaws have microscopic size with less size level than the wavelength of visible light, while the large flaws have substantially larger size than the small flaws.

In the case of first light guide panel portion 110 with the large flaws 170 disposed on the inner surface 110b, when light L1 transmitting into first light guide panel portion 110 strikes or hits at the large flaws 170, the light L1a is reflected at a larger reflecting angle which differs from the angle of internal total reflection than an internal transmissible angle and the light L1b is ejected from the outer surface 110a without any flaws opposed to the inner surface 110b with the flaws 170 as shown in FIG. 4. In contrast to the above-mentioned case, in the case of first light guide panel portion 110 with the small flaws disposed on the outer surface 110a which differs from the former case, light L1a striking at the small flaws is diffused and the diffused light (not shown in drawings) is ejected nondirectionally from the outer surface 110a.

The grooves or flaws 170 may are formed on the inner surface 110a and/or on the outer surface 110b of first light guide panel portion 110 by various methods such as a manual filing method with a sand paper, a hot stamping method, a ultrasonic stamping method, a bursting method, a brushing method and an etching method.

The light diffusing apparatus 100 is composed of a single transparent panel-like member having first, second and third portions 110, 120 and 130 and it is preferably made of a transparent organic material (i.e. transparent plastic material) or thermoplastic resin such as acrylic resin and copolymer mainly including acrylic resin, typically PMMA (Polymethylmethacrylate) and copolymer of MMA (Methylmethacrylate) and styrene whose softening temperature is about 70. degree. C. to about 120. degree. C. and the refractive index of about 1.49, Polystyrene (PS) resin whose softening temperature is about 70. degree. C. to about 120. degree. C. and refractive index of about 1.59 or Polycarbonate (PC) resin with whose softening temperature is about 120. degree. C. to about 140. degree. C. and refractive index of about 1.58.

In the hot stamping method, first light guide panel portion 110 is pressed on the inner surface 110b (as shown in FIG. 4) and/or on the outer surface 110a (not shown in FIG. 4) by a press plate heated with a heater having an emery surface or a rough surface with a predetermined pattern on the press plate like the inner and/or outer surfaces 110b and/or 110a.

The light diffusing means, for another example, may be composed of multiple light diffusing printed layers or films with light diffusing function or the like disposed on the first major surface 110a and/or the second major surface 110b. In FIG. 4, a plurality of the light diffusing printed layers 180 is disposed on the inner surface 110b of first light guide portion 110. The light diffusing layers 180 are formed by painting using painting material including light diffusing powders such as glass beads or white pigments on the first major surface 110a and/or the second major surface 110b. The predetermined pattern with multiple dots and/or multiple stripes of the light diffusing layers 180 are printed on the surface 110a or 110b.

First light guide portion 110, second light guide portion 120 and third light guide portion 130 of the transparent panel-like member 100 form a U-shaped cross section as a whole. Each of first light guide portion 110 and second light guide portion is a leg of the U-shaped cross section 120 and third light guide portion 130 is a bottom of the U-shaped cross section. The cross section of the bottom may have a curved or half-round shape as shown in FIG. 1 to FIG. 4. First light guide portion 110 and second light guide portion 120 of the transparent panel-like member 100 are positioned adjacent to and parallel with each other and form substantially linear cross section, while third light guide portion 130 forms substantially non-linear cross section.

In FIG. 1 and FIG. 2, first light guide portion 110 has first side surface 110c and the second light guide portion 110 has second side surface 110c. The side surface 10c of the first light guide portion 110 may be terminated at close vicinity to the second side surface 120c of the second light guide portion 120. The linear fluorescent lamp is positioned facing to the first and second side surfaces 110c and 120c.

In FIG. 2 and FIG. 4, when the linear lamp 200 lights up (i.e. is lit) on the linear lamp 200 emits light in its front direction and also its rear direction. The light emitting in the rear direction at the reflector 210 is redirected to the front side by the reflector 210. So, almost all the emitting light becomes upper light L1 and lower light L2. The light L1 is introduced into the side surface 110c of first light guide portion 110 of light diffusing apparatus 100 and also the light L2 is introduced into the side surface 120c of first light guide portion 120. That is, the side surface 110c receives i.e. accepts the light L1 and also the side surface 120c receives the light L2.

FIG. 4 illustrates light transmission path in which the light transmission path in first, second and third light guide portions 110, 120 and 130 of the light diffusing apparatus 100 is indicated in dotted lines and arrows.

In FIG. 4, the panel-like first light guide portion 110 with a linear cross section preferably has the light diffusing means such as the multiple grooves 170 or the multiple light diffusing layers 180 on the inner surface 110b (and/or the outer surface 110a) of the first light guide portion 110. The light L1, a part of the light emitting from the single linear lamp 200 (See FIG. 1 and FIG. 2) is received or introduced from the side surface 110c into the panel-like first light guide portion 110. The light L1 is transmitted inside first light guide portion 110 from the side surface 110c to opposite direction. The light L1 is repeated multiply between the outer surface 110a and the inner surface 110b of the first light guide portion 110, based on an optical principle known as "total reflection". At the same time, the light L1 transmitted directing to the opposite direction is forced to diffuse selectively at the dotted or stripe area forming the light diffusing pattern, where the grooves 170 and/or the light diffusing layers 180 are present or existing as shown as double arrows at the area 170 and 180 in FIG. 4. Therefore, a part of the light L1 leaks outside gradually from the inner and/or outer surfaces 110a and 110b on the way to the opposite direction.

It should be noted that first light guide portion 110 of the light diffusing apparatus 100 is acting as light leakage means also acting light transmission means and as explained in the above, while second light guide portion 120 of the light diffusing apparatus 100 is solely acting as light transmission means with minimized leakage or with minimized transmission loss, or acting as a bypass light guide capable of transmitting light with maximized transmission efficiency equivalent to optical fibers.

Further, it should be noted that third light guide portion 130 receives light transmitting from second light guide portion 120 with minimized transmission loss i.e. with maximized transmission efficiency, reflects the light repeatedly and redirect the light so as to transmit the light into first light guide portion 110, based on an optical principle equivalent to an optical fiber as is widely known.

Referring again in FIG. 4, the light L2, a part of the light emitting from the single linear lamp 200 (See FIG. 1 and FIG. 2) is received from the side surface 120c into the panel-like second light guide portion 120. The light L2 is transmitted inside second light guide portion 120 from the side surface 120c to opposite direction. In contrast to first light guide portion 120, second light guide portion 120 (i.e. second light guide panel) is not provided with the light diffusing means such as the multiple grooves 170 and/or the multiple light diffusing printed layers 180 as already explained. And also second light guide panel 120 is preferably provided with first light reflecting layers 140 on its all outer surface 120a and/or the panel 120 is preferably provided with second light reflecting layers 150 on its all inner surface 120b. Therefore, most light L2 introduced from the side surface 120c into the light guide panel 120 (or substantially all input light L2 into the light guide panel 120 via the side surface 120c) is transmitting effectively inside the light guide panel 120 with minimized loss i.e. with maximized transmission efficiency, repeating multiple reflections based on "total reflection" of an optical principle as shown as dotted lines with an arrow mark in FIG. 4.

As a result of highly efficient transmission of the light L2 inside second light guide panel 120, most light L2 enables to arrive at an end of second light guide panel 120 opposing to the side surface 120c which is also an entrance 130a of third light guide portion 130. Third light guide portion 130 may be composed of transparent material with panel-like member as well as the first and second guide portions 110 and 120. The third light guide panel 130 may have a nonlinear cross section and preferably have a half-round (i.e. half circular), an arc, or a curved cross section, while first and second light guide panels 110 and 120 may have a linear cross section as shown in FIG. 4 (and FIG. 1 to FIG. 3). Further, the third light guide panel 130 may have preferably the light reflective layer 140 on almost all an outer surface 130a and another light reflective layer 150 on all an inner surface 130b, in which the layers 140 and 150 is made of transparent material with lower refractive index than that of the light guide panel 130 in which the panel 130 is equivalent to a core of an optical fiber and the layers 140 and 150 are equivalent to a cladding of the optical fiber. The light L2 input into the half-round light guide panel 130 is also transmitted reflecting multiply at the outer and inner surfaces 130a and 130b. And the light L2 is changed its direction (i.e. redirected) and arrived at an exit 130d of third light guide panel 130 which is also an end of first light guide panel 110 opposed to the side surface 110c of first light guide panel 110.

The redirected light L2 is transmitted into first light guide panel 110 from the end 130 to the side surface 110c. Where the redirected light L2 is stroked at the light diffusing means, i.e. the light diffusing printed layers 180 in FIG. 4 interfaced with first light guide panel 110, the light L2 is forced to diffuse i.e. scatter and diffusing light L2b is going out from the outer surface 110a and the inner surface 110b. Where the redirected light L2 is stroked at the outer and/or inner surfaces 110a and 110b without light diffusing printed layers 180, non-diffusing light L2a continues to be transmitting to the side surface 110c.

The diffusing light L1b and L2B output from the outer surface 110a of first light guide panel 110 can illuminate, light or irradiate an object such as liquid crystal displays (LCDs).

In FIG. 4, a light reflecting means 190 such as a white or other colored film-like (or panel-like) member may preferably be disposed on the inner surface 110b of first light guide panel 110 or be disposed on the inner surface 120b of second light guide panel 120, so as to redirect the diffusing light L1b and L2b to first light guide panel 110 via the inner surface 110b, in which the light L1b and L2b returned at the first light guide panel 110 can be output outside from the outer surface 110a or can be transmitted to the side surface 110c.

In FIG. 5 showing a method for manufacturing the light diffusing apparatus 100 (See FIG. 3 and FIG. 4), the method includes the following steps and sequence.

(1) First step: A single transparent panel-like member i.e. a single flat transparent panel PL (i.e. sheet, plate or film) may preferably have dual flat rectangular surfaces and have a uniform thickness. The transparent panel PL is made of transparent resin panel such as transparent acrylic or polycarbonate resin, or transparent glass. The single flat panel PL is composed of a first light guide portion 110, a third light guide portion 130 and a second light guide portion 120 in which the first, third and second light guide portions 110, 130 and 120 are continuously elongated in this order forming a single piece unit. The continuous light reflective layers 130a and 130b are disposed on the front surfaces 130a and 120a of the third and second light guide portions 130 and 120. Further, the continuous light reflective layers 120a and 120b are disposed on a rear surfaces 120a and 130a of the third and second light guide portions 130 and 120. The first light guide portion 110 has a first function for light transmission and light leakage, while the second and third light guide portions 120 and 130 have a second function for solely for light transmission, in which the third light guide portion 130 is positioned in an interim zone between the first light guide portion 110 and the second light guide portion 120.

(2) a heating step: A heat is applied to at least third light guide portion 130 in such a way that the sufficient heating is applied selectively to third light guide portion 130 of the single flat transparent panel PL in order to soften more than its softening temperature by a heater or dryer as shown as arrow marks in FIG. 5.

(3) a bending step: Third light guide portion 130 is bent according to a bending direction marked with an arrow in FIG. 5 during softening so that first and second portions 110 and 120 are substantially parallel each other and keep substantially in linear i.e. flat shape, while third portion 130 has curved in nonlinear i.e. a half-round shape in the embodiment as shown in FIG. 4 and FIG. 5. In FIG. 5, phantom lines indicate the shape of second and third portions 120 and 130 after bending state.

(4) a cooling step: Heat is removed so that the light diffusing apparatus 100 keeps a U-shaped cross section as a whole in an ambient temperature as shown in FIG. 5, in which first light guide portion 110 is a leg of the U-shaped cross section, second light guide portions 120 is another leg of the U-shaped cross section and third light guide portions 130 is a bottom of the U-shaped cross section.

According to the above mentioned steps, the light diffusing apparatus with single piece construction 100 is manufactured having linear first and second light guide portions 110 and 120 and a nonlinear light guide portion 130, in which first light guide portion 110 has dual function leaking and transmitting light, second light guide portion 120 has a single function solely transmitting light, and third light guide portion 130 has a light communication function between first and second light guide portions 110 and 120.

Further, the first preferred embodiment using the transparent sheet-like or film-like member may be modified in such a manner that the first, second and/or third portions are composed of a plurality of transparent sheet-like or film-like members and they are superimposed each other to form a laminate.

Figure 6:
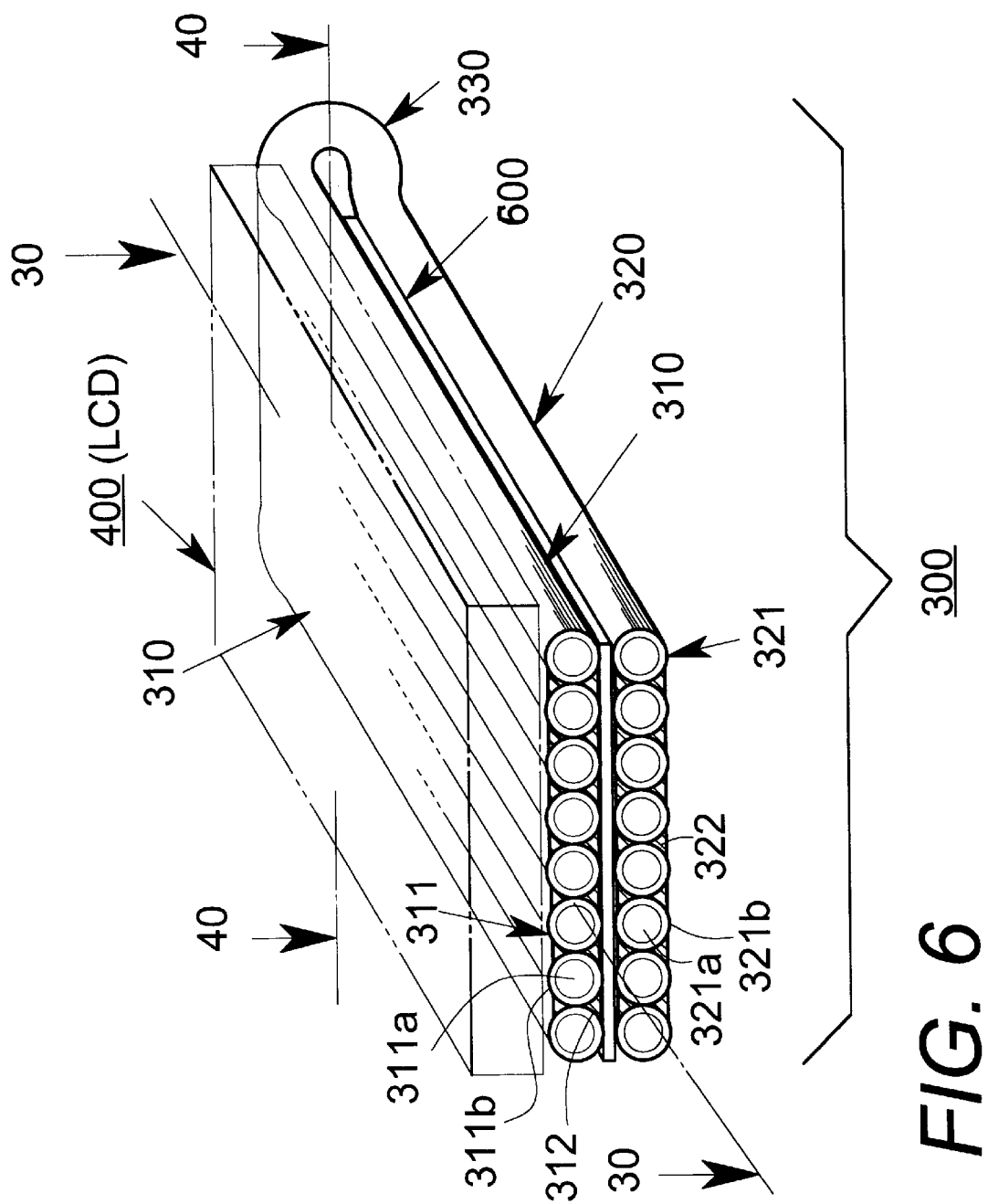
FIG. 6 is a schematic perspective view of another light diffusing apparatus according to second preferred embodiment of the present invention.
Figure 7:
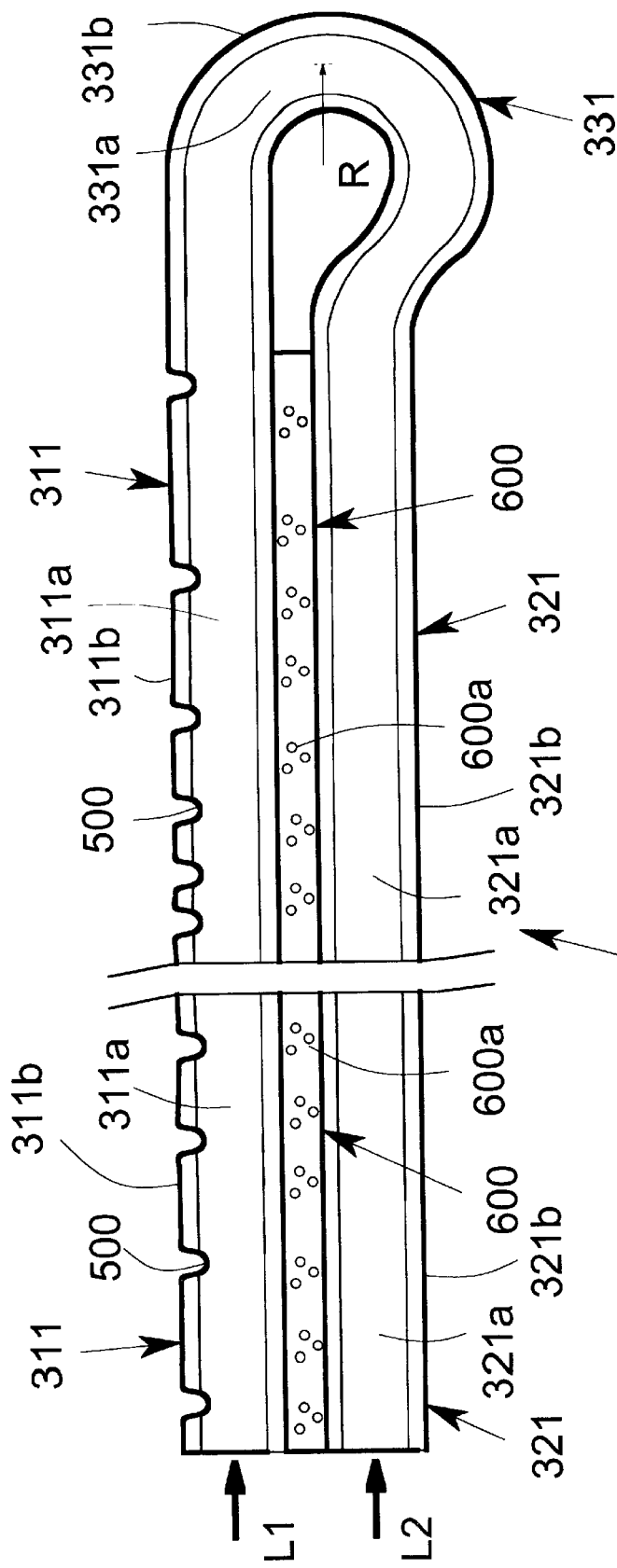
FIG. 7 is a partial enlarged cross-sectional view of the light diffusing apparatus taken along the line 30—30 in the perspective FIG. 6.
Figure 8:
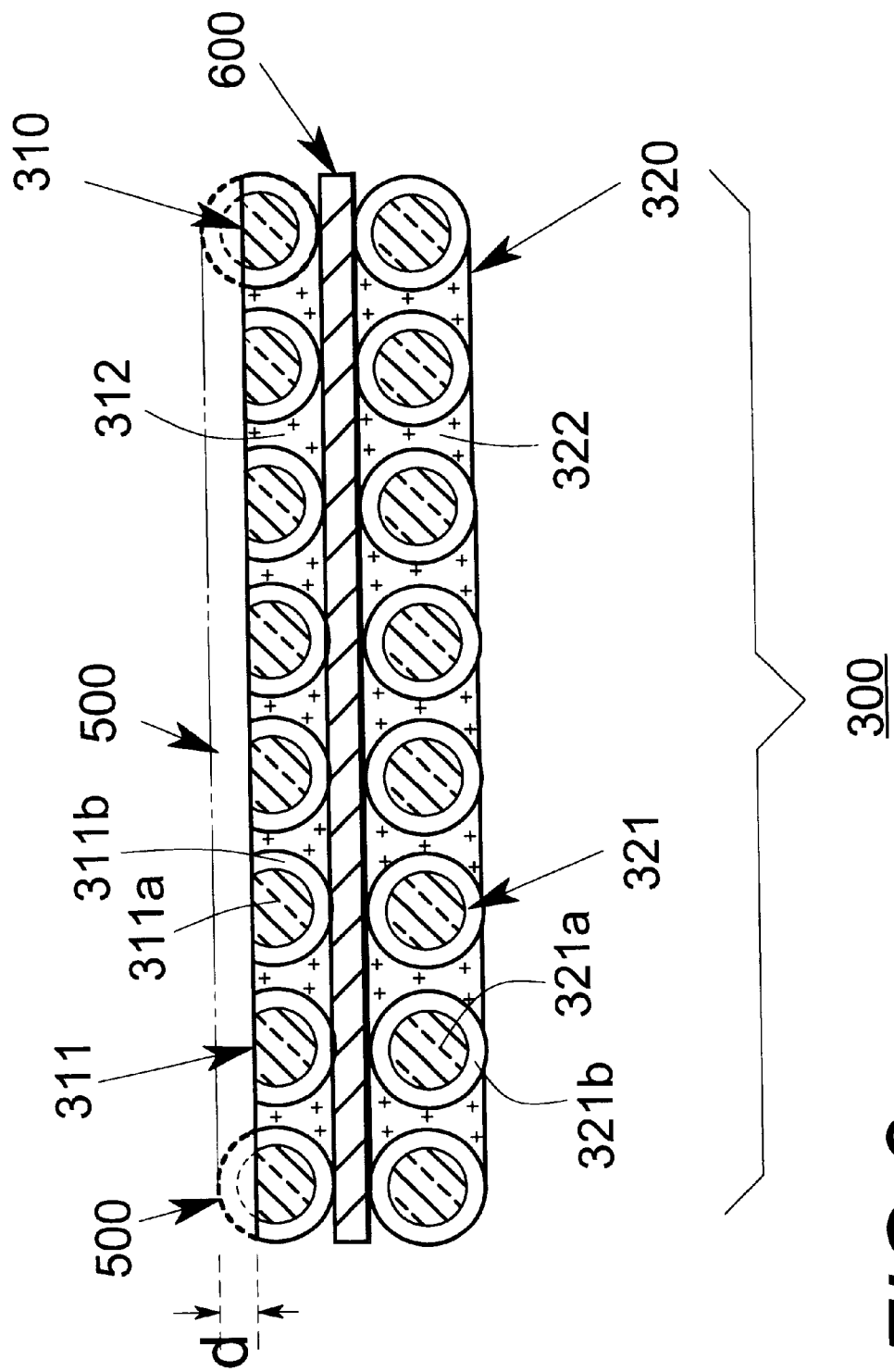
FIG. 8 is an enlarged cross-sectional view of the light diffusing apparatus taken along the line 40—40 in the perspective FIG. 6.

Referring to FIG. 6, FIG. 7 and FIG. 8, the second preferred embodiment of the present invention are shown in which another inventive concept of the second aspect of the present invention is realized or embodied, in which a ribbon-like (i.e. flat-like, sheet-like or tape-like) optical fiber cable is used for a light diffusing apparatus 300 e.g. a light diffusing apparatus, while the panel-like transmission member is used for the light diffusing apparatus 100 in the first preferred embodiment.

Generally, the ribbon-like optical fiber cables are widely used In the technical field of lighting i.e. illumination, optical communication or optical wiring means, in which a plurality of optical fibers are aligned parallel and adjacent to each other and are maintained in a substantially flat and longitudinally elongated shape so as to form a single-piece ribbon-like body by any bonding means for bonding the optical fibers in a single ribbon-like unit. Any ribbon-like cables are used for the second preferred embodiment, which have the optimum bonding means such as an adhesive resin to bond the optical fibers, a flat adhesive-backed supporter to support and bond the optical fibers, dual adhesive-backed tapes to sandwich and bond the optical fibers or a plastic sheath to cover the optical fibers.

The light diffusing apparatus 300 is composed of a first light guide portion 310, a second light guide portion 320 and a third light guide portion 330. As is explained before, the first light guide portion 310 is for use in illumination or lighting which acts as light leakage means and also light transmission means, second light guide portion 320 is for use as bypass light guide means which acts solely as light transmission means (i.e. acts as light transmission only) and third light guide portion 330 is for use in light coupling means and also light transmission means.

The third light guide portion 330 is positioned in an interim section or zone between the first and second light guide portions 310 and 320, which communicates optically with the first and second light guide portions 310 and 320 with maximized transmission efficiency (i.e. with minimized light leakage), in which the third light guide portion 330 redirects light transmitting from second light guide portion 320 in order to let the light introduce (i.e. input or conduct) into the first light guide portion 310. The ribbon optical fiber cable 300 is composed of a plurality of optical fibers having entirely a length elongated longitudinally, in which the optical fibers are aligned in parallel and adjacent each other. Further the plurality of optical fibers are composed of a plurality of first optical fibers 311, a plurality of second optical fibers 321 and a plurality of third optical fibers 331, in which the first, second and third optical fibers 311, 321, and 331 respectively have different function each other. That is, the first optical fibers 311 corresponding to the first light guide portion 310 act as light leaking or light diffusing means, the second optical fibers 321 corresponding to the second light guide portion 320 act solely as bypass light guide or act as bypass light guide only and the third optical fibers 331 corresponding to the first light guide portion 330 act as light coupling means to communicate optically the second and first optical fibers 321 and 311.

Each of the optical fibers 311, 321 and 331 are respectively composed of a core 311a, 321a and 331a having high transmission efficiency and high refractive index and a cladding 311b, 321b and 331b (i.e. clad or sheath) having lower refractive index than the core 311a, 321a and 331a.

In FIG. 6 and FIG. 7, the first optical fibers 311 have a plurality of first end faces (i.e. end surfaces) and the second optical fibers 311 have a plurality of second end faces (i.e. end surfaces) and the first and second end faces are positioned adjacent and parallel. The first and second end faces receive light L1 and light L2 emitting from at least one light generating means which may be composed of same single linear lamp positioned facing to the dual end faces as shown in FIG. 1 and FIG. 2.

The first, second and third plurality of optical fibers 311, 321 and 333 are respectively bonded by means of adhesive resin 312 and 322 for bonding the optical fibers adjacent and parallel in order to form a substantially flat ribbon-like body as shown in FIG. 6 and FIG. 8, however other bonding means are used as substitute for the adhesive resin.

The plurality of first optical fibers 311 corresponding to the first light guide portion 310 of the light diffusing apparatus 300 have substantially linear cross section and substantially flat first and second major surfaces, in which transmitting light inside the first optical fibers 311 is diffused outside from the flat first and/or second major surfaces. The plurality of second optical fibers 321 corresponding to the second light guide portion 320 of the light diffusing apparatus 300 have substantially linear cross section and substantially flat first and second major surfaces as same as the first optical fibers 311, in which light is transmitting inside the second optical fibers 321 with maximized light transmission efficiency and with minimized light leakage which differs completely from the first optical fibers 311.

The plurality of third optical fibers 331 corresponding to the third light guide portion 330 of the light diffusing apparatus 300 have substantially nonlinear (e.g. curved or bending) cross section and substantially nonlinear first and second major surfaces which differs completely from the first and second optical fibers 311 and 321. In FIG. 7, the optical fibers 331 have a curvature forming a circular arc in cross section or semicircular cross section with a bending radius R2 in which a value of permissible bending radius R2 is determined according to a diameter of a single bare optical fiber so that the value of bending radius R2 roughly varies inversely proportional to a diameter of the bare optical fiber.

After light L2 is received at the second end face of the second optical fibers 321 with linear cross section, the light L2 travels reflecting repeatedly inside the second optical fibers 321 toward an entrance of the third optical fibers 331 and reaches the entrance of the third optical fibers 331 with maximized light transmission efficiency and with minimized light leakage. Next, the light L2 travels reflecting repeatedly inside the third optical fibers 331 with nonlinear or curved cross section changing gradually a direction of the light L2 along a curvature of the optical fibers 331 toward an entrance of the first optical fibers 331 and reaches the entrance of the first optical fibers 311. That is, the third optical fibers 331 corresponding to the third light guide portion 330 in the light diffusing apparatus 300 communicate or couple optically with the first optical fibers 311 corresponding to the first light guide portion 310 in such a way that the light L2 is input or introduced into the third optical fibers 331 with nonlinear cross section from the second optical fibers 321 with linear cross section, the light L2 is transmitting throughout the third optical fibers 331, and the redirecting light L2 is input into the first optical fibers 311 so as to transmit inside the first optical fibers 311 and also diffuse outside for illuminating the LCD display 400, etc.

Plastic i.e. polymer optical fibers or plastic optical fiber cables are preferably used for the second preferred embodiment and each fiber having a polymer core made of transparent resin having high optical refractive index e.g. PMMA (Polymethylmethacylate) with refractive index of about 1.49 and a polymer cladding covering the core made of transparent resin having lower optical refractive index than the core e.g. fluoro polymer with refractive index of about 1.40. The plastic optical fibers or plastic optical fiber cables have many advantages such as low cost, robustness against bending and mechanical shocks and lightweight in comparison to glass optical fibers or optical fiber cables. Therefore, the plastic optical fibers or optical fiber cable may be recommendable for use in the second embodiment, which may apply to backlights of liquid crystal displays (LCDs)

Such plastic optical fiber/fibers are available under a trade name of "ESKA" from Mithubishi Rayon Co., Ltd., Tokyo, JAPAN and the product catalogues can be obtained from a web homepage of ESKA optical fiber division, Mitsubishi Rayon: http://www.mrc.co.jp/dep/pofeskae/comme/comme.htm). Various form of the ESKA plastic optical fiber/fibers are available such as a bare fiber i.e. wire, cord, cable and sheet i.e. ribbon in which the bare fiber has a diameter of about 0.1 mm to about 3.0 mm and a permissible mechanical (i.e. physical) bending radius, for instance, of about 5 mm in the bare fiber with 0.75 mm diameter which decreases with increase of the fiber diameter.

In FIG. 7 and FIG. 8, most first optical fibers 311 in the first light guide portion 310 respectively have a plurality of grooves 500, by which the claddings 311b (and the core 311a) are partially deleted or removed so as to diffuse or leak light to outside. The grooves 500 have a depth "d" (FIG. 8) on the first optical fibers 311 so as to expose partially the cores 311a and output light from the cores 311a to outside. The grooves 500 may be formed in a desire pattern by various methods such as hot stamping, sand blasting, laser beam irradiating and etching. Different from the first optical fibers 311 in the first light guide portion 310, the second and third optical fibers 321 and 331 in the second and third light guide portion 320 and 330 have not the grooves 500 in which the cores 321a and 331a have the claddings 321a and 331a entirely to cover the cores 321a and 331a so as to transmit light with maximized transmission efficiency i.e. with minimum leakage of light. The grooves 500 form totally a desired predetermined pattern on most surface of the first optical fibers 311 such as a gradation pattern in which density (or quantity) of the grooves 500 are gradually increased from end surfaces receiving light L1 to a center of the surface and are gradually decreased from the center toward the third optical fibers 331 so as to produce a uniform surface brightness i.e. luminance of the substantially flat ribbon-life cable 300.

A film-like or sheet-like member 600 may be disposed in a gap between the first and second optical fibers 310 and 320, which may be made of transparent organic adhesive resin including multiple light reflecting particles, so as to laminate substantially flat first and second optical fibers 310 and 320, to keep the optical fibers 310 and 320 in a combined linear shape cross section. The adhesive film 600 can redirect light diffusing downwardly from the first optical fibers 310 to upwardly for leaking outside. Furthermore, a mirror layer may be disposed on front surfaces of the second optical fibers 321 and the adhesive film 600 so as to promote redirection of diffusing light (not shown in the drawing).

Therefore, the light diffusing apparatus 300 according to the second preferred embodiment can illuminate uniformly all effective surface of a passive display such as the liquid crystal display (LCD) 400 in FIG. 6.

Figure 9:
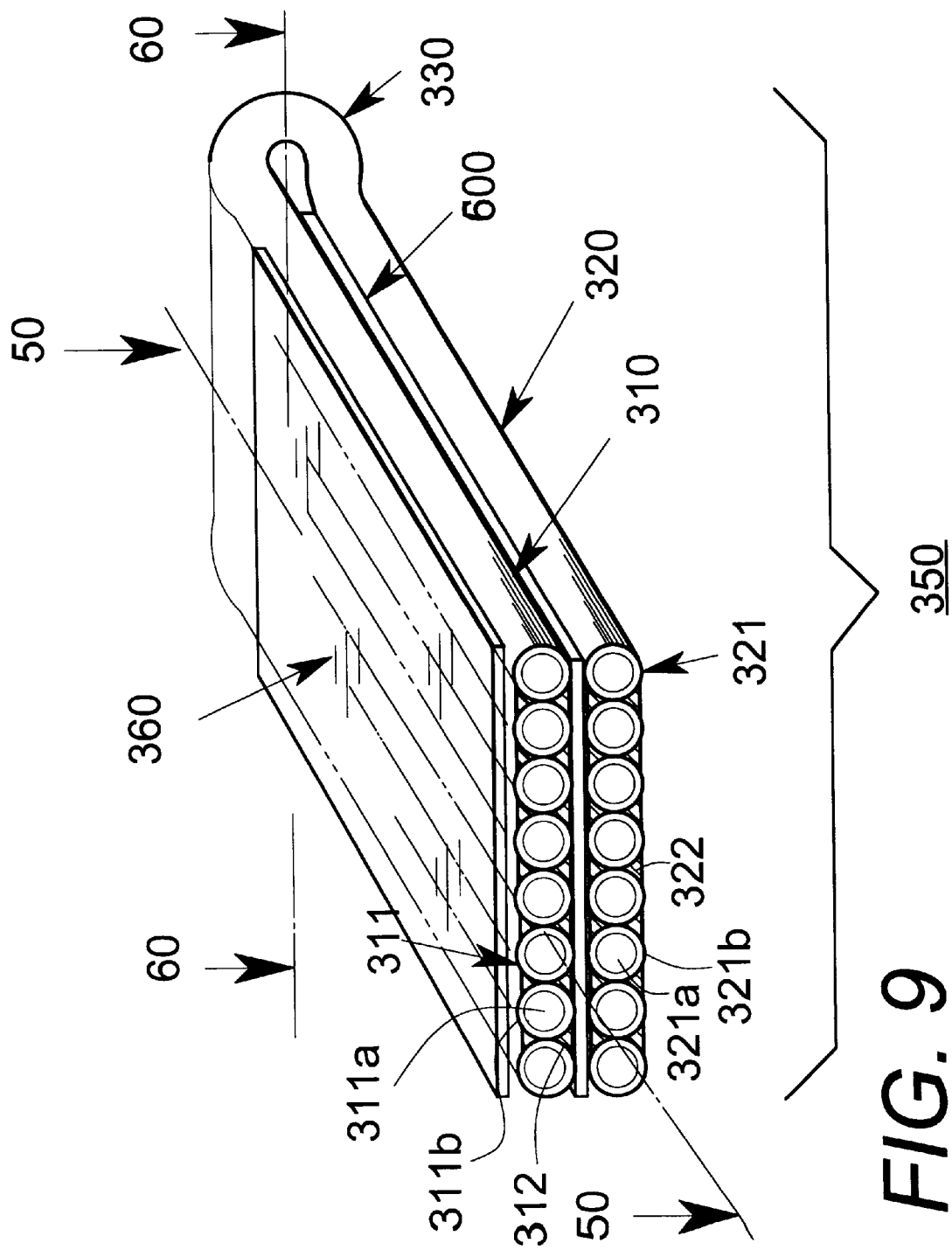
FIG. 9 is a schematic perspective view of still another light diffusing apparatus according to a modification of the second preferred embodiment of the present invention.
Figure 10:
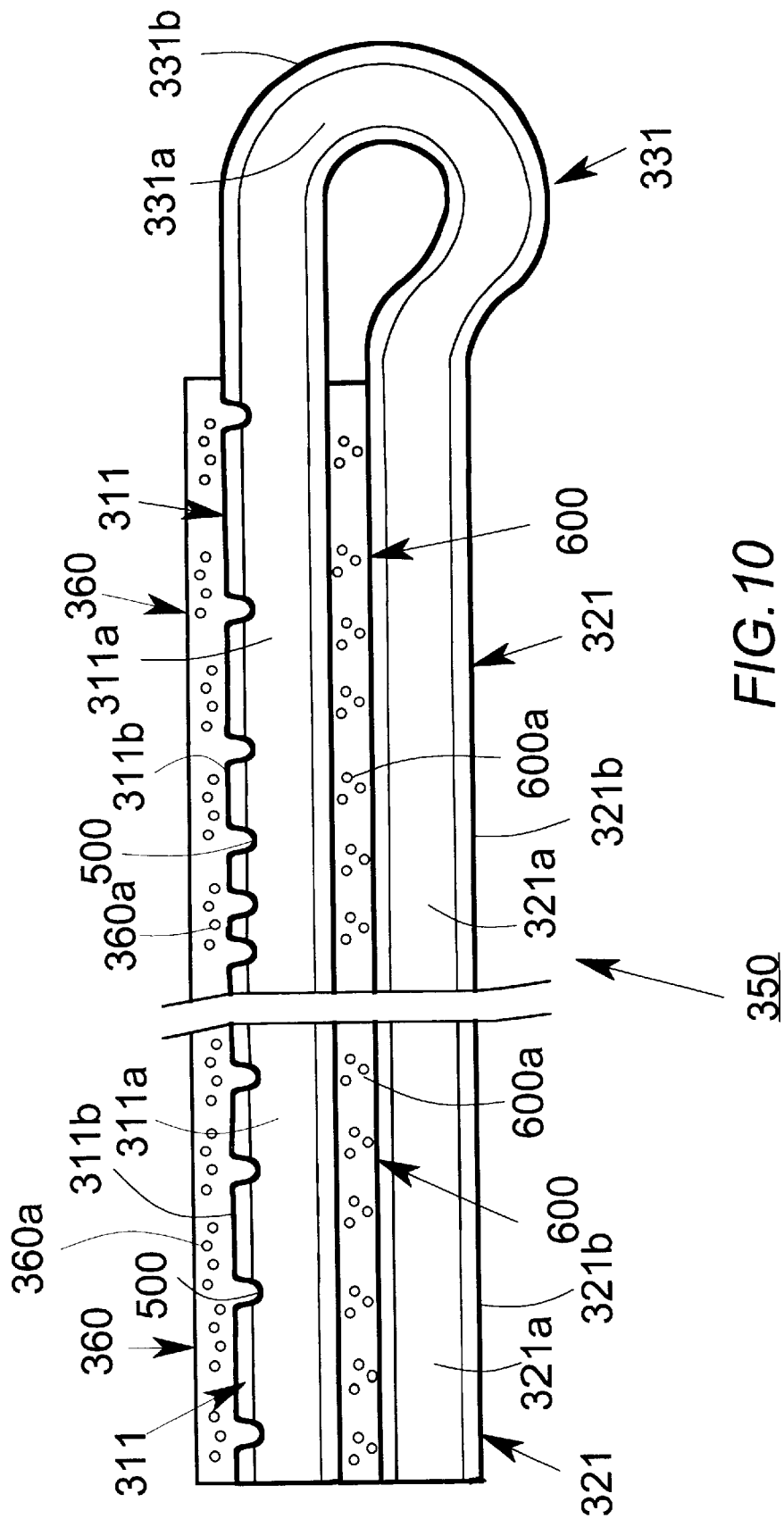
FIG. 10 is a partial enlarged cross-sectional view of the light diffusing apparatus taken along the line 50—50 in the perspective FIG. 9.
Figure 11:
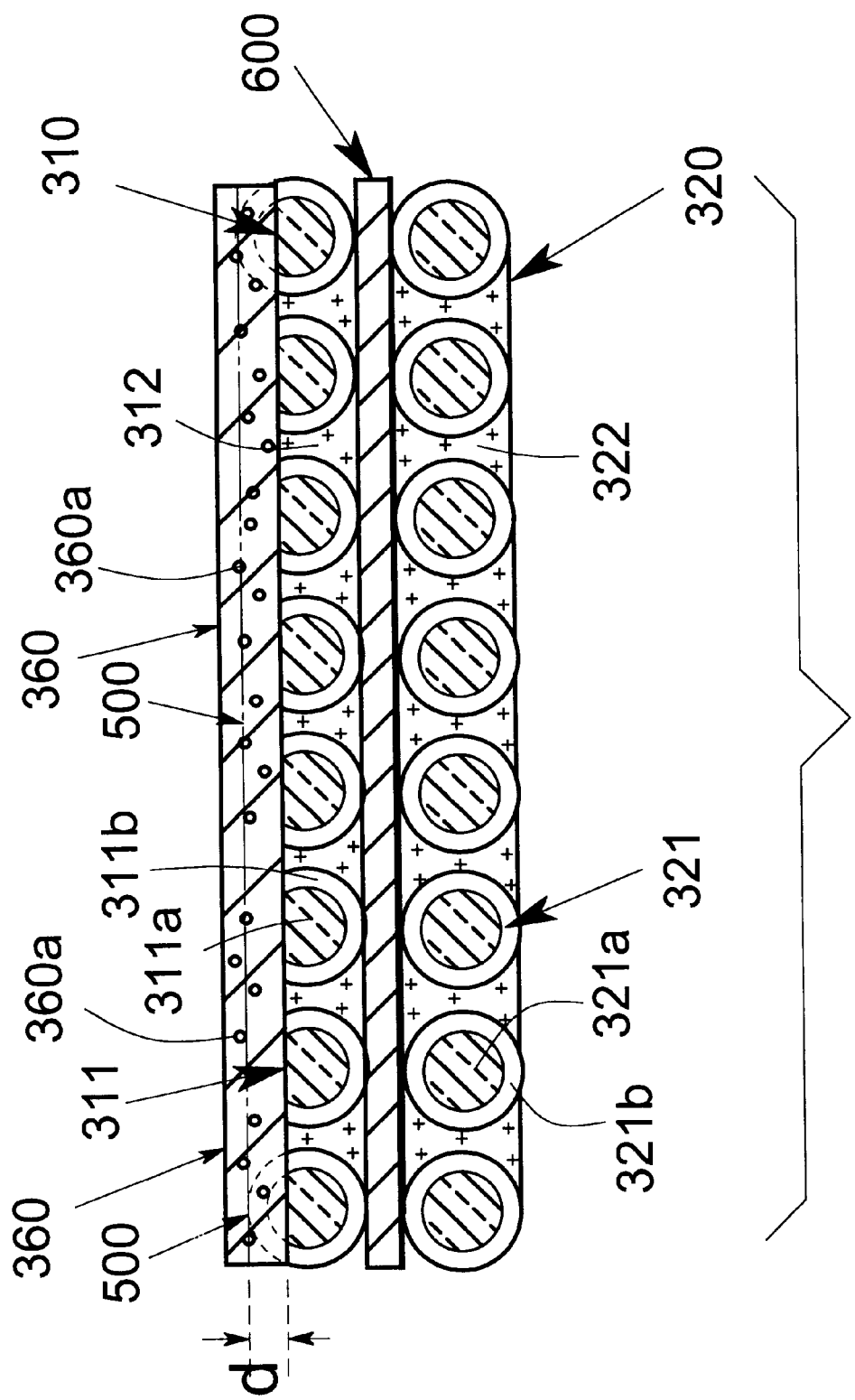
FIG. 11 is an enlarged cross-sectional view of the light diffusing apparatus taken along the line 60—60 in the perspective FIG. 9.

Referring to FIG. 9, FIG. 10, and FIG. 11, which show a modification of the second preferred embodiment of the present invention, in which FIG. 9 is a schematic perspective view of still another light diffusing apparatus according to a modification of the second preferred embodiment of the present invention, FIG. 10 is a partial enlarged cross-sectional view of the light diffusing apparatus taken along the line 50—50 in the perspective FIG. 9 and FIG. 11 is an enlarged cross-sectional view of the light diffusing apparatus taken along the line 60—60 in the perspective FIG. 9.

In FIG. 9, FIG. 10 and FIG. 11 showing a modification of the second preferred embodiment, overlapping description with the second preferred embodiment is possibly omitted for simplifying explanation because like reference characters or numerals designate like or corresponding parts throughout several views in FIG. 6, FIG. 7 and FIG. 8.

A light diffusing apparatus 350 is composed of a single ribbon-like optical fiber cable having a first light guide portion 310 with substantially linear cross section acting as light diffusing means, a second light guide portion 320 with substantially linear cross section solely acting as light transmission means and a third light guide portion 330 with substantially nonlinear cross section acting as light coupling (i.e. communication) means to couple the second and first light guide portions 320 and 310. The light diffusing apparatus 350 is further composed of a plurality of first optical fibers 311 corresponding to the first light guide portion 310, a plurality of second optical fibers 321 corresponding to the second light guide portion 310 and a plurality of third optical fibers 331 corresponding to the third light guide portion 310. The first, second and third optical fibers 310, 320 and 330 respectively have a plurality of cores 311a, 321a and 331a and a plurality of claddings 311b, 321b and 331b to cover the cores.

The first optical fibers 311 have a plurality of grooves 500 with a desired and predetermined pattern disposed on most a front surface of the first optical fibers 311. By means of the grooves 500, the cores 311a and the claddings 311b of the first optical fibers 310 are partially removed and exposed outside for leaking or diffusing light outside relating to location of the grooves 500.

In FIG. 9, FIG. 10 and FIG. 11, the transparent layer 360 is disposed on the front surface with the grooves 500 so as to cover most exposed portions of the cores 311a and the claddings 311b. The transparent layer 360 is preferably made of transparent organic resin with optical refractive index more than refractive index of the claddings 311b or the cores 311a. Therefore, light incident to the grooves 500 from the exposed cores 310 is allowed to leak outside. Further, the transparent layer 360 may include multiple light diffusing particles 360a for diffusing light incident to the transparent layer 360, in which the light diffusing particles 360a may be made of material such as glass or polymer beads or white pigments.

For example, the transparent layer 360 may be made of transparent UV- curable acrylic resin with a refractive index of about 1.43, while the claddings 311b may be made of fluorinated resin i.e. fluoropolymer such as polyvinylidene fluoride with a refractive index less than about 1.40, in which refractive index of the transparent layer 360 is higher than that of the claddings 311b and for another example the transparent layer 360 may be made of transparent UV-curable epoxy resin with a refractive index of about 1.56 (available from Norland Product Inc., New Jersey, U.S.A.), while the cores 311a may be made of PMMA resin with a refractive index of about 1.49, in which a refractive index of the transparent layer 360 is higher than that of the cores 311a.

Further, the second preferred embodiment using the ribbon-like optical fiber cable may be modified in such a manner that the first, second and/or third portions are composed of a plurality of ribbon-like optical fiber cables and they are superimposed each other to form a laminate.

While certain preferred embodiments of the present invention have been disclosed in detail, it is to be understood that the present invention is not limited to the specific embodiments thereof and that various modifications, changes and equivalents may be made in the present invention without departing from the spirit of the present invention or the scope of the accompanying claims.

What is claimed is:

1. A light diffusing apparatus using light guide comprising:
   (a) a first light guide portion being integrally formed with a second light guide portion and a third light guide portion, said first light guide portion having a first end which is opposed to a second end of said second light guide portion and said third light guide portion being curved;
   (b) said first light guide portion to leak and transmit light, said second light guide portion solely to transmit light and said third light guide portion to communicate optically with said first and second light guide portions;
   (c) said first and second light guide portions being disposed vertically and adjacently to each other; and
   (d) a plurality of light leaking means to form a gradation pattern, being disposed to be variably distributed on said first light guide portion.

2. The light diffusing apparatus using light guide according to claim 1:
   wherein said graduation pattern is formed so that a density of said light leaking means is gradually increased from said first end toward a vicinity of center of said first light guide portion and gradually decreased from said vicinity of center toward said third light guide portion.

3. The light diffusing apparatus using light guide according to claim 1:
   wherein said light leaking means are composed of a plurality of grooves to leak light to outside at said grooves.

4. The light diffusing apparatus using light guide according to claim 1, further comprising:
   an adhesive member disposed between said first and second light guide portions so as to form a laminate.

5. The light diffusing apparatus using light guide according to claim 1, further comprising:
   (a) an adhesive member disposed between said first and second portions so as to form a laminate; and
   (b) wherein said adhesive member is made of a substantially transparent adhesive resin including a plurality of light reflecting particles.

6. The light diffusing apparatus using light guide according to claim 1, further comprising:
   a mirror layer interposed between said first and second light guide portions.

7. The light diffusing apparatus using light guide according to claim 1, further comprising:
   (a) a substantially transparent layer to cover said light leaking means, disposed on said first light guide portion; and
   (b) wherein said transparent layer has refractive index more than refractive index of said first light guide portion.

8. The light diffusing apparatus using light guide according to claim 1, further comprising:
   (a) a substantially transparent layer to cover said light leaking means, disposed on said first light guide portion;
   (b) wherein said transparent layer has refractive index more than refractive index of said first light guide portion and
   (c) wherein said substantially transparent layer is made of a substantially transparent organic resin.

9. The light diffusing apparatus using light guide according to claim 1, further comprising:
   (a) a substantially transparent layer to cover said light leaking means, disposed on said first light guide portion;
   (b) wherein said transparent layer has refractive index more than refractive index of said first light guide portion; and
   (c) wherein said transparent layer includes a plurality of light diffusing particles.

10. The light diffusing apparatus using light guide according to claim 1, further comprising:
    (a) a substantially transparent layer to cover said light leaking means, disposed on said first light guide portion;
    (b) wherein said transparent layer has refractive index more than refractive index of said first light guide portion; and
    (c) wherein said transparent layer includes a plurality of light diffusing particles.

11. The light diffusing apparatus using light guide according to claim 1, further comprising:
    (a) a substantially transparent layer to cover said light leaking means, disposed on said first light guide portion;
    (b) wherein said transparent layer has refractive index more than refractive index of said first light guide portion; and
    (c) wherein said transparent layer includes a plurality of light diffusing particles made of a plurality of glass or polymer beads.

12. The light diffusing apparatus using light guide according to claim 1, further comprising:
    (a) a substantially transparent layer to cover said light leaking means, disposed on said first light guide portion;
    (b) wherein said transparent layer has refractive index more than refractive index of said first light guide portion; and
    (c) wherein said transparent layer includes a plurality of light diffusing particles made of a plurality of pigments.

13. The light diffusing apparatus using light guide according to claim 1, further comprising:
    (a) at least one light generating means; and
    (b) wherein said first and second ends receive light emitting from said light generating means.

14. The light diffusing apparatus using light guide according to claim 1, further comprising:
    (a) at least one light generating means;
    (b) wherein said first and second ends are disposed vertically and adjacently to each other, in which said ends being terminated at a substantially same position; and
    (c) wherein said first and second ends receive light emitting from said light generating means.

15. A light diffusing apparatus using light guide comprising:
- (a) a first light guide portion being integrally formed with a second light guide portion and a third light guide portion, said first light guide portion having a first end opposed to a second end of said second light guide portion and said third light guide portion being curved;
- (b) said first light guide portion to leak and transmit light, said second light guide portion solely to transmit light and said third light guide portion to communicate optically with said first and second light guide portions;
- (c) said first light guide portion composed of a plurality of first optical fibers, each of first optical fibers having a core with high refractive index and a cladding with lower refractive index than said core, in which said cladding covers partially said core or said cladding is entirely removed from said core;
- (d) said second and third light guide portions respectively composed of a plurality of second and third optical fibers, each of said second and third optical fibers having a core with high refractive index and a cladding with lower refractive index than said core, in which said cladding covers entirely said core; and
- (e) said first, second and third optical fibers being aligned in parallel to each other so as to form a single ribbon-like optical fiber cable.

16. The light diffusing apparatus using light guide according to claim 15, further comprising:
an adhesive member disposed between said first and second light guide portions so as to form a laminate.

17. The light diffusing apparatus using light guide according to claim 15, further comprising:
- (a) an adhesive member disposed between said first and second portions so as to form a laminate; and
- (b) wherein said adhesive member is made of a substantially transparent adhesive resin including a plurality of light reflecting particles.

18. The light diffusing apparatus using light guide according to claim 15, further comprising:
a mirror layer interposed between said first and second light guide portions.

19. The light diffusing apparatus using light guide according to claim 15, further comprising:
- (a) a substantially transparent layer disposed on at least a plurality of exposed portions of said cores of said first optical fibers; and
- (b) wherein said transparent layer has refractive index more than refractive index of said cladding and/or said core.

20. The light diffusing apparatus using light guide according to claim 15, further comprising:
- (a) a substantially transparent layer disposed on at least a plurality of exposed portions of said cores of said first optical fibers;
- (b) wherein said transparent layer has refractive index more than refractive index of said cladding and/or said core; and
- (c) wherein said exposed portions are formed by a plurality of grooves to remove partially said cores of said first optical fibers.

21. The light diffusing apparatus using light guide according to claim 15, further comprising:
- (a) a substantially transparent layer disposed on at least a plurality of exposed portions of said cores of said first optical fibers;
- (b) wherein said transparent layer has refractive index more than refractive index of said cladding and/or said core; and
- (c) wherein said transparent layer is made of a substantially transparent organic resin.

22. The light diffusing apparatus using light guide according to claim 15, further comprising:
- (a) a substantially transparent layer disposed on at least a plurality of exposed portions of said cores of said first optical fibers;
- (b) wherein said transparent layer has refractive index more than refractive index of said cladding and/or said core; and
- (c) wherein said transparent layer includes a plurality of light diffusing particles.

23. The light diffusing apparatus using light guide according to claim 15, further comprising:
- (a) a substantially transparent layer disposed on at least a plurality of exposed portions of said cores of said first optical fibers;
- (b) wherein said transparent layer has refractive index more than refractive index of said cladding and/or said core; and
- (c) wherein said transparent layer includes a plurality of light diffusing particles made of a plurality of glass or polymer beads.

24. The light diffusing apparatus using light guide according to claim 15, further comprising;
- (a) a substantially transparent layer disposed on at least a plurality of exposed portions of said cores of said first optical fibers;
- (b) wherein said transparent layer has refractive index more than refractive index of said cladding and/or said core; and
- (c) wherein said transparent layer includes a plurality of light diffusing particles made of a plurality of pigments.

25. The light diffusing apparatus using light guide according to claim 15, further comprising:
- (a) at least one light generating means; and
- (b) wherein said first and second ends receive light emitting from said light generating means.

26. The light diffusing apparatus using light guide according to claim 15, further comprising:
- (a) at least one light generating means;
- (b) wherein said first and second ends are disposed vertically and adjacently to each other, in which said ends being terminated at a substantially same position; and
- (c) wherein said first and second ends receive light emitting from said light generating means.

27. A light diffusing apparatus using light guide comprising:
- (a) a first light guide portion being integrally formed with a second light guide portion and a third light guide portion, said first light guide portion having a first end opposed to a second end of said second light guide portion and said third light guide portion being curved;
- (b) said first light guide portion to leak and transmit light, said second light guide portion solely to transmit light and said third light guide portion to communicate optically with said first and second light guide portions;
- (c) said first light guide portion composed of a plurality of first optical fibers, each of first optical fibers having a core with high refractive index and a cladding with lower refractive index than said core, in which said cladding covers partially said core or said cladding is entirely removed from said core;

(d) said second and third light guide portions respectively composed of a plurality of second and third optical fibers, each of said second and third optical fibers having a core with high refractive index and a cladding with lower refractive index than said core, in which said cladding covers entirely said core; and (e) said first, second and third optical fibers being aligned in parallel to each other so as to form a single ribbon-like optical fiber cable; and (f) said first and second light guide portions being disposed vertically and adjacently to each other.

28. The light diffusing apparatus using light guide according to claim 27:
wherein said first and second ends being disposed vertically and adjacently to each other.

29. The light diffusing apparatus using light guide according to claim 27:
wherein said first and second ends being disposed vertically and adjacently to each other, in which said ends terminate at a substantially same position and receive light from at least one light generating means.

30. The light diffusing apparatus using light guide according to claim 27, further comprising:
an adhesive member disposed between said first and second light guide portions so as to form a laminate.

31. The light diffusing apparatus using light guide according to claim 27, further comprising:
(a) an adhesive member disposed between said first and second portions so as to form a laminate; and
(b) wherein said adhesive member is made of a substantially transparent adhesive resin including a plurality of light reflecting particles.

32. The light diffusing apparatus using light guide according to claim 27, further comprising:
a mirror layer interposed between said first and second light guide portions.

33. The light diffusing apparatus using light guide according to claim 27, further comprising:
(a) a substantially transparent layer disposed on at least a plurality of exposed portions of said cores of said first optical fibers; and
(b) wherein said transparent layer has refractive index more than refractive index of said cladding and/or said core.

34. The light diffusing apparatus using light guide according to claim 27, further comprising:
(a) a substantially transparent layer disposed on at least a plurality of exposed portions of said cores of said first optical fibers;
(b) wherein said transparent layer has refractive index more than refractive index of said cladding and/or said core; and
(c) wherein said exposed portions are formed by a plurality of grooves to remove partially said cores of said first optical fibers.

35. The light diffusing apparatus using light guide according to claim 27, further comprising:
(a) a substantially transparent layer disposed on at least a plurality of exposed portions of said cores of said first optical fibers;
(b) wherein said transparent layer has refractive index more than refractive index of said cladding and/or said core; and (c) wherein said transparent layer is made of a substantially transparent organic resin.

36. The light diffusing apparatus using light guide according to claim 27, further comprising:
(a) a substantially transparent layer disposed on at least a plurality of exposed portions of said cores of said first optical fibers;
(b) wherein said transparent layer has refractive index more than refractive index of said cladding and/or said core; and
(c) wherein said transparent layer includes a plurality of light diffusing particles.

37. The light diffusing apparatus using light guide according to claim 27, further comprising:
(a) a substantially transparent layer disposed on at least a plurality of exposed portions of said cores of said first optical fibers;
(b) wherein said transparent layer has refractive index more than refractive index of said cladding and/or said core; and
(c) wherein said transparent layer includes a plurality of light diffusing particles made of a plurality of glass or polymer beads.

38. The light diffusing apparatus using light guide according to claim 27, further comprising:
(a) a substantially transparent layer disposed on at least a plurality of exposed portions of said cores of said first optical fibers;
(b) wherein said transparent layer has refractive index more than refractive index of said cladding and/or said core; and
(c) wherein said transparent layer includes a plurality of light diffusing particles made of a plurality of pigments.

39. The light diffusing apparatus using light guide according to claim 27, further comprising:
(a) at least one light generating means; and
(b) wherein said first and second ends receive light emitting from said light generating means.

40. The light diffusing apparatus using light guide according to claim 27, further comprising:
(a) at least one light generating means;
(b) wherein said first and second ends are disposed vertically and adjacently to each other, in which said ends being terminated at a substantially same position; and
(c) wherein said first and second ends receive light emitting from said light generating means.

41. The light diffusing apparatus using light guide according to claim 27, further comprising:
(a) an adhesive member disposed between said first and second portions so as to form a laminate; and
(b) wherein said laminate is composed of said first and second portions and said adhesive member therebetween.

42. The light diffusing apparatus using light guide according to claim 27, further comprising:
(a) an adhesive member disposed between said first and second portions so as to form a laminate, in which said laminate is composed of said first and second portions and said adhesive member therebetween; and
(b) wherein said adhesive member is made of a substantially transparent adhesive resin including a plurality of light reflecting particles.

43. The light diffusing apparatus using light guide according to claim 27, further comprising:

a light reflecting means interposed between said first and second portions.

44. The light diffusing apparatus using light guide according to claim 27, further comprising:
   a substantially transparent layer disposed on at least an exposed portion of said core in said first major surface.

45. The light diffusing apparatus using light guide according to claim 27, further comprising:
   (a) a substantially transparent layer disposed on at least an exposed portion of said core in said first major surface; and
   (b) wherein said substantially transparent layer is made of a substantially transparent organic resin.

46. The light diffusing apparatus using light guide according to claim 27, further comprising:
   (a) a substantially transparent layer disposed on at least an exposed portion of said core in said first major surface;
   (b) wherein said substantially transparent layer is made of a substantially transparent organic resin; and
   (c) wherein said substantially transparent layer has refractive index more than refractive index of said cladding and/ or said core.

47. The light diffusing apparatus using light guide according to claim 27, further comprising:
   (a) a substantially transparent layer disposed on at least an exposed portion of said core in said first major surface; and
   (b) wherein said substantially transparent layer includes a plurality of light diffusing particles.

48. The light diffusing apparatus using light guide according to claim 27, further comprising:
   (a) a substantially transparent layer disposed on at least an exposed portion of said core in said first major surface; and
   (b) wherein said substantially transparent layer includes a plurality of light diffusing particles, in which said light diffusing particles are made of glass or polymer beads.

49. The light diffusing apparatus using light guide according to claim 27, further comprising:
   (a) a substantially transparent layer disposed on at least an exposed portion of said core in said first major surface; and
   (b) wherein said substantially transparent layer includes a plurality of light diffusing particles, in which said light diffusing particles are made of pigments.

50. The light diffusing apparatus using light guide according to claim 27:
   wherein said light diffusing means are a plurality of grooves, in which said claddings are removed from said core at said grooves so as to diffuse light to outside.

51. The light diffusing apparatus using light guide according to claim 27:
   (a) wherein said light diffusing means are a plurality of grooves, in which said claddings are removed from said core at said grooves; and
   (b) wherein said grooves are covered by said substantially transparent layer having refractive index more than refractive index of said cladding and/ or said core.

52. The light diffusing apparatus using light guide according to claim 27, further comprising:
   (a) at least one light generating means; and
   (b) wherein said first and second ends receive light emitting from said light generating means.

53. The light diffusing apparatus using light guide according to claim 27, further comprising:
   (a) at least one light generating means;
   (b) wherein said first and second ends are disposed vertically and adjacently to each other, in which said ends being terminated at a substantially same position; and
   (c) wherein said first and second ends receive light emitting from said light generating means.

54. A light diffusing apparatus using light guide comprising:
   (a) a first light guide portion being integrally formed with a second light guide portion and a third light guide portion, said first light guide portion having a first end which is opposed to a second end of said second light guide portion and said third light guide portion being curved;
   (b) said first light guide portion to leak and transmit light, said second light guide portion solely to transmit light and said third light guide portion to communicate optically with said first and second light guide portions;
   (c) said first light guide portions composed of a plurality of first optical fibers, each of first optical fibers having a core with high refractive index and a cladding with lower refractive index than said core, in which said cladding covers partially said core or said cladding is entirely removed from said core;
   (d) said second and third light guide portions respectively composed of a plurality of second and third optical fibers, each of said second and third optical fibers having a core with high refractive index and a cladding with lower refractive index than said core, in which said cladding covers entirely said core;
   (e) said first, second and third optical fibers being aligned in parallel to each other so as to form a single ribbon-like optical fiber cable; and
   (f) a plurality of light leaking means to form a gradation pattern, being disposed to be variably distributed on said first light guide portion.

55. The light diffusing apparatus using light guide according to claim 54:
   (a) wherein a plurality of light leaking means for diffusing light transmitting an interior of said first light guide portion, disposed so as to be variably distributed on said first light guide portion; and
   (b) wherein a density of said plurality of light diffusing means are increased from said first end toward a center of said first light guide portion and decreased from said center toward said third light guide portion.

56. The light diffusing apparatus using light guide according to claim 54, further comprising:
   an adhesive member disposed between said first and second portions so as to form a laminate.

57. The light diffusing apparatus using light guide according to claim 54, further comprising:
   (a) an adhesive member disposed between said first and second portions so as to form a laminate; and
   (b) wherein said adhesive member is made of a substantially transparent adhesive resin including a plurality of light reflecting particles.

58. The light diffusing apparatus using light guide according to claim 54, further comprising:
   a mirror layer interposed between said first and second portions.

59. The light diffusing apparatus using light guide according to claim 54, further comprising:
   (a) a substantially transparent layer disposed on at least a plurality of exposed portions of said cores of said first optical fibers; and (b) wherein said transparent layer has refractive index more than refractive index of said cladding and/or said core.

60. The light diffusing apparatus using light guide according to claim 54, further comprising:
   (a) a substantially transparent layer disposed on at least a plurality of exposed portions of said cores of said first optical fibers;
   (b) wherein said transparent layer has refractive index more than refractive index of said cladding and/or said core; and
   (c) wherein said transparent layer is made of a substantially transparent organic resin.

61. The light diffusing apparatus using light guide according to claim 54, further comprising:
   (a) a substantially transparent layer disposed on at least a plurality of exposed portions of said cores of said first optical fibers;
   (b) wherein said transparent layer has refractive index more than refractive index of said cladding and/or said core; and
   (c) wherein said substantially transparent layer includes a plurality of light diffusing particles.

62. The light diffusing apparatus using light guide according to claim 54, further comprising:
   (a) a substantially transparent layer disposed on at least a plurality of exposed portions of said cores of said first optical fibers;
   (b) wherein said transparent layer has refractive index more than refractive index of said cladding and/or said core; and
   (c) wherein said transparent layer includes a plurality of light diffusing particles made of a plurality of glass beads.

63. The light diffusing apparatus using light guide according to claim 54, further comprising:
   (a) a substantially transparent layer disposed on at least a plurality of exposed portions of said cores of said first optical fibers;
   (b) wherein said transparent layer has refractive index more than refractive index of said cladding and/or said core; and
   (c) wherein said transparent layer includes a plurality of light diffusing particles made of a plurality of polymer beads.

64. The light diffusing apparatus using light guide according to claim 54, further comprising:
   (a) a substantially transparent layer disposed on at least a plurality of exposed portions of said cores of said first optical fibers;
   (b) wherein said transparent layer has refractive index more than refractive index of said cladding and/or said core; and
   (c) wherein said transparent layer includes a plurality of light diffusing particles made of a plurality of pigments.

65. The light diffusing apparatus using light guide according to claim 54, further comprising:
   (a) at least one light generating means; and
   (b) wherein said first and second ends receive light emitting from said light generating means.

66. The light diffusing apparatus using light guide according to claim 54, further comprising:
   (a) at least one light generating means;
   (b) wherein said first and second ends are disposed vertically and adjacently to each other, in which said ends being terminated at a substantially same position; and
   (c) wherein said first and second ends receive light emitting from said light generating means.

* * * * *